United States Patent
Ganser et al.

(10) Patent No.: US 6,532,935 B2
(45) Date of Patent: Mar. 18, 2003

(54) METHOD OF OPERATING AN INTERNAL COMBUSTION ENGINE

(75) Inventors: Thomas Ganser, Wernau (DE); Thomas Kaiser, Denkendorf (DE); Charles R. Koch, Remseck/Pattonville (DE); Kurt Maute, Sindelfingen (DE); Christoph Schmitz, Kornwestheim (DE); Martin Spanninger, Stuttgart (DE)

(73) Assignees: DaimlerChrysler AG, Stuttgart (DE); Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/867,248

(22) Filed: May 29, 2001

(65) Prior Publication Data
US 2002/0179052 A1 Dec. 5, 2002

(30) Foreign Application Priority Data
May 23, 2000 (DE) .......................................... 100 25 494

(51) Int. Cl.$^7$ .................................................. F02P 5/00
(52) U.S. Cl. .................. 123/406.29; 123/679; 123/435; 123/406.44
(58) Field of Search ............................. 123/90.11, 352, 123/361, 406.29, 406.44, 406.45, 406.49, 406.55, 406.52, 681, 691, 692, 486

(56) References Cited

U.S. PATENT DOCUMENTS

| | | | | |
|---|---|---|---|---|
| 5,392,215 A | * | 2/1995 | Morita | ........................ 123/352 |
| 5,463,993 A | * | 11/1995 | Livshits et al. | ......... 123/339.11 |
| 6,189,523 B1 | * | 2/2001 | Weisbrod et al. | ........ 123/27 GE |
| 6,311,670 B1 | * | 11/2001 | Constancis | .................. 123/352 |
| 6,332,450 B1 | * | 12/2001 | Muto et al. | .................. 123/352 |
| 6,412,470 B1 | * | 7/2002 | Denz | ........................... 123/352 |

FOREIGN PATENT DOCUMENTS

| | | |
|---|---|---|
| DE | 33 34 720 | 4/1985 |
| DE | 35 39 605 | 5/1987 |
| DE | 35 40 420 | 6/1988 |
| DE | 196 11 363 | 6/1997 |
| DE | 196 28 024 | 1/1998 |
| DE | 197 00 711 | 9/1998 |

* cited by examiner

*Primary Examiner*—John Kwon
(74) *Attorney, Agent, or Firm*—Klaus J. Bach

(57) ABSTRACT

In a method of operating an internal combustion engine which has at least two cylinder banks that can be controlled separately as a function of a desired load, wherein a desired pressure in the intake pipe of the internal combustion engine is determined and set by means of an air supply device for supplying combustion air to the cylinders of the internal combustion engine, at least one engine-related characteristic value which affects the behavior of the internal combustion engine is determined for each cylinder bank, and, in the event of a difference between the characteristic values of the cylinder banks, at least one cylinder bank is manipulated in such a way that the average value of the considered characteristic quantity corresponds to a desired average value in order to reduce the thermodynamic and mechanical loading of the internal combustion engine with bank-selective operating mode.

14 Claims, 6 Drawing Sheets

METHOD OF OPERATING AN INTERNAL COMBUSTION ENGINE

BACKGROUND OF THE INVENTION

The invention relates to a method of operating an internal combustion engine, which has at least two cylinder banks that can be controlled separately depending on the desired engine power output.

The document DE 196 11 363 C1 discloses a multi-cylinder internal-combustion piston engine having two cylinder banks which are both operative during full-load operation of the internal combustion engine, whereas one cylinder bank is shut down during part-load operation in order to save fuel and to improve the exhaust emission behavior. The internal combustion engine has a different dynamic behavior during part-load operation than it has during full-load operation. This has to be taken into account in the control of the internal combustion engine, in particular the throttle-valve control, the Lambda control or the knock control, and also in the determination of the engine-related control parameters, for example the ignition and injection timing parameters. For an optimal setting, therefore, it is necessary that specially adapted performance graphs are assigned to each mode of operation. In particular when changing over from full-load operation to part-load operation, or vice versa, care must be taken to ensure that controller instabilities are avoided.

The document DE 33 34 720 C2 discloses a control apparatus for cylinder shutdown by means of which a cylinder bank can be shut down only at steady-state operating points of the engine, whereby the risk of instabilities is reduced but the shutdown instant is restricted to steady-state operating points.

A further problem in internal combustion engines with bank-selective operation can occur as a result of asymmetric loading during full-load operation, which can be attributed to production tolerances. In this case, the performance data of the cylinder banks deviate from one another since the air supply, the ignition timing, the injection and/or the actuation of the gas exchange valves may differ for each cylinder bank. This results in non-uniform component loading in the cylinder banks and, in addition, in an impaired response behavior in particular under transient operating conditions. Primarily the smoothness of the engine is adversely affected.

It is the object of the invention to reduce the thermodynamic and mechanical loading in an internal combustion engine with bank-selective operating capability. Furthermore, the response behavior is to be improved.

SUMMARY OF THE INVENTION

In a method of operating an internal combustion engine which has at least two cylinder banks that can be controlled separately as a function of a desired load, wherein a desired pressure in the intake pipe of the internal combustion engine is determined and set by means of an air supply device for supplying combustion air to the cylinders of the internal combustion engine, at least one engine-related characteristic value which affects the behavior of the internal combustion engine is determined for each cylinder bank, and, in the event of a difference between the characteristic values of the cylinder banks, at least one cylinder bank is manipulated in such a way that the average value of the considered characteristic value corresponds to a desired average value in order to reduce the thermodynamic and mechanical loading of the internal combustion engine with bank-selective operating mode.

With the method according to the invention, at least two cylinder banks of the internal combustion engine can be controlled separately by determining a characteristic value of the internal combustion engine for each cylinder bank and, in the event of a difference between the characteristic values of the different cylinder banks, at least one cylinder bank is controlled in such a way that the average value of the considered characteristic value corresponds to a desired average value. The characteristic values considered are, especially the ignition timing, the beginning of fuel injection, the duration of fuel injection and/or the opening and closing curves of the gas exchange valves. As one of these characteristic values which can describe the thermodynamic behavior of the internal combustion engine is determined for each cylinder bank and the cylinders are so operated that a desired average value is achieved, differences in the cylinder banks of the internal combustion engine which, in particular, can be attributed to production tolerances are at least partly compensated for. As a result, an at least approximately uniform loading of the individual cylinder banks during part-load operation can be achieved. Non-uniform, asymmetrically distributed instances of loading between the cylinder banks are avoided.

As engine-related performance characteristics, which form the basis of the assessment of whether a behavior deviates from a standard, certain actual values of the internal combustion engine are preferably determined, either directly by measurement or indirectly from a correlation with a measured characteristic value, or a characteristic value of the internal combustion engine determined in some other way. The momentary injection times for each cylinder bank are determined as characteristic values. This provides for affording the advantage that the actual injection times are known from the energizing and de-energizing instants of the fuel injection elements, so that an additional measurement is unnecessary. The present injection times can be the beginning of injection and/or the duration of injection or the instant at which injection ends.

Advantageously, in the event of a difference between the characteristic quantities considered, the cylinder banks are set by manipulation of characteristic values which differ from those characteristic values which form the basis of the assessment of the behavior of each cylinder bank. In this case, it has proved to be expedient to provide gas exchange valves whose opening and closing curves can be set, in particular with regard to opening and closing instants, which can preferably be realized by using electromagnetically actuable gas exchange valves.

The function via which the cylinder banks are to be set advantageously comprises a differential element in which the difference between the characteristic quantities of two cylinder banks to be investigated is formed. This difference is subsequently fed to an integrator element in which numerical integration is carried out. The correction value is present at the integrator output and is to be supplied to one, or preferably to both, cylinder banks. By respective positive or negative signs, the correction value cylinder bank which has comparatively higher characteristic performance values is weakened, and conversely a cylinder bank with comparatively weaker characteristic performance values is strengthened. As a result of this procedure, the level of the considered characteristic performance values is lowered in one cylinder bank, whereas the level is raised in the other cylinder bank. In this embodiment, the desired average value is not calculated explicitly, rather level equalization is automatically established by virtue of the uniform raising and lowering of the considered characteristic performance values in the cylinder banks. The level is between the initial values of the considered characteristic performance values but not necessarily corresponding to the arithmetic mean of the initial values. It is unnecessary for the desired average value to be explicitly determined.

In order to obtain a smooth profile of values, it may be expedient to subject the considered characteristic performance values to low-pass filtering, in particular after the difference formation. The low-pass filtering has the effect of filtering at frequencies below the low-pass filter cut-off frequency.

In a preferred embodiment, the timing ignition and the fuel injection timing of each cylinder bank are determined as a function of the desired load, which can be determined as a desired value by driver specification, in particular the position of the accelerator pedal, but also as a function of further values such as control variables of a driving-dynamics stability program. This embodiment, which can also be referred to as predictive load control, is distinguished by a fast response behavior since the desired load acts as a pre-control value which directly forms the basis for the ignition timing and the fuel injection timing. The desired load advantageously forms the basis of both the control of the fuel side and the setting of the air side of the internal combustion engine. The air side adjustments can be made by manipulation of the gas exchange valves, and if appropriate alternatively or supplementary thereto also by the setting of a throttle valve in the intake tract.

Further advantages and features of the invention will become apparent from the following description of an embodiment thereof described on the basis of the accompanying drawings:

DESCRIPTION OF A PREFERRED EMBODIMENT

Figure 1:
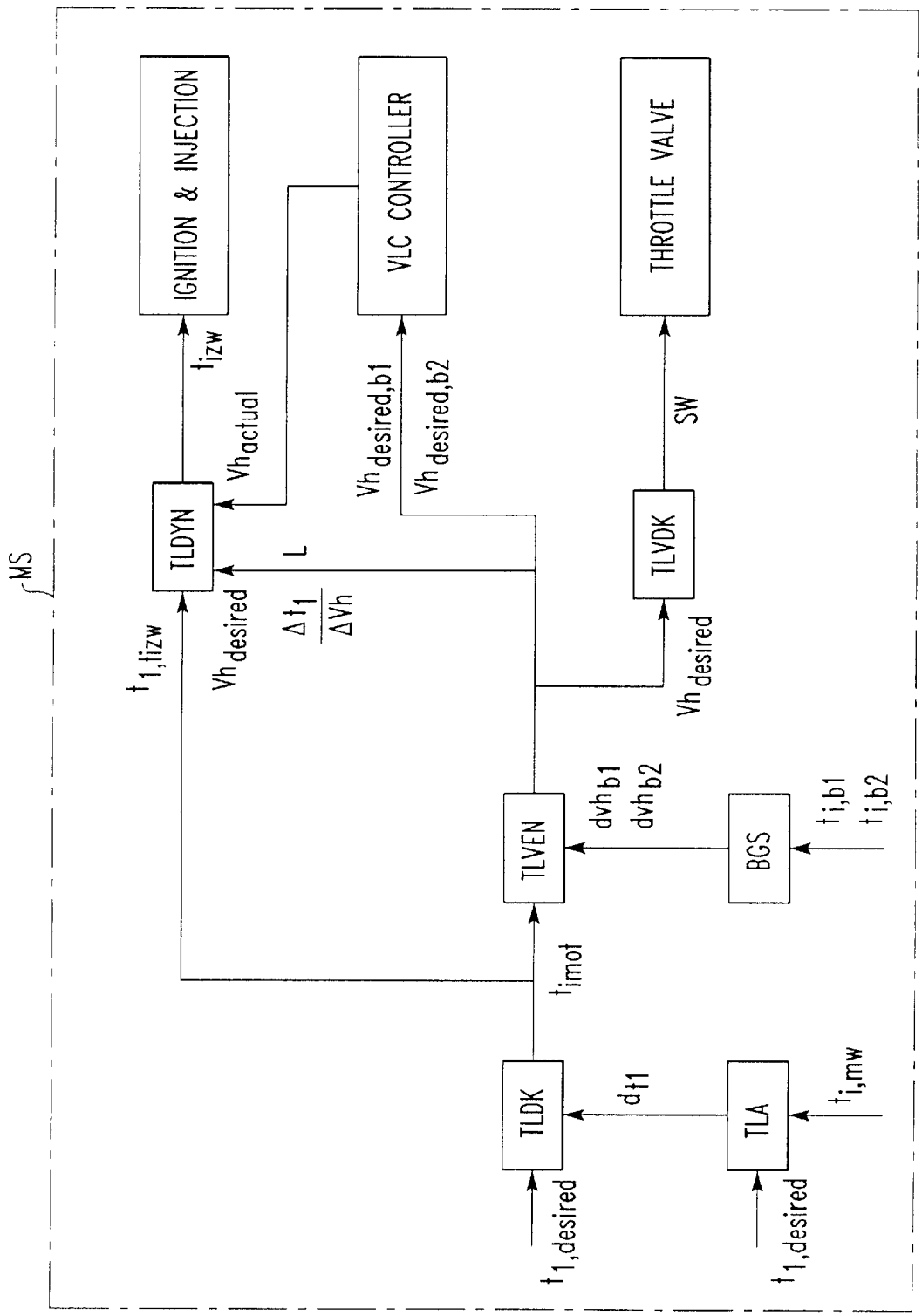
FIG. 1 shows the structure of an engine control unit for setting the ignition and the injection timing as a function of the desired load.

FIG. 1 shows, in a diagrammatic illustration, the structure of an engine controller and regulator for the metering of combustion air and the determination of the associated ignition data and injection data, where the amount of combustion air is to be set both by means of a throttle element, in particular a throttle valve, in the intake tract and by means of variably adjustable gas exchange valves provided with VLC controllers. In the engine controller and regulator MS, firstly the desired load $t_{l,desired}$ is determined, which can be represented as a function of the accelerator pedal position and, if appropriate, of further variables, in particular the present slope inclination. The desired load $t_{l,desired}$ may additionally depend on manipulated variables of a driving-dynamics control program.

The desired load $t_{l,desired}$ is firstly fed to a function block TLA comprising an adaptation function for averaging the parameters relating to ignition and injection during steady-state operation. In the function block TLA, a correction load $dt_l$ is determined as a function of the desired load $t_{l,desired}$ and of an average injection duration $t_{i,mw}$, which correction load value is fed as correction element to a further function block TLDK.

Ambient compensation takes place in the function block TLDK in that firstly the desired load $t_{l,desired}$, taking account of the ambient pressure $p_a$ and taking account of the ambient temperature $T_a$, is based on normalized pressure and temperature values $p_{a,0}$, $T_{a,0}$. Moreover, the correction load $dt_l$ is additionally taken into account in the function block TLDK. A value for the desired air volume $t_{l,mot}$ is present at the output of the function block TDLK, which value corresponds to the desired load $t_{l,desired}$ taking account of the ambient conditions and the correction load value. The desired air volume $t_{l,mot}$ is assigned ignition and injection parameters $t_{l,tizw}$ (desired load for ignition and injection).

The desired air volume $t_{l,mot}$ is firstly fed to a function block TLVEN, in which the valve stroke for the variably adjustable gas exchange valves of the internal combustion engine is determined as a function of the air volume $t_{l,mot}$. In the exemplary embodiment, the internal combustion engine shall have two separately activatable cylinder banks, each cylinder bank being assigned gas exchange valves having an adjustable stroke. Following this structure, different values $vh_{desired,b1}$ and $vh_{desired,b2}$ for the desired valve stroke of the gas exchange valves of the first and second cylinder banks of the internal combustion engine are generated in the function block TLVEN. In this case, correction valve strokes $dvh_{b1}$, $dvh_{b2}$ from a bank equalizing function block BGS are taken into account, differing values for the valve strokes of different cylinder banks being matched to an average value in the said bank equalizing function block.

The desired valve stroke $vh_{desired,b1}$ and $vh_{desired,b2}$ is fed as desired value to be set to a VLC controller which can be used to manipulate the valve stroke of the gas exchange valves.

If appropriate, more than two cylinder banks with separately adjustable gas exchange valves may also be provided.

Depending on the operating range in which the internal combustion engine is operated, it may be necessary, in addition or as an alternative to the setting of the gas exchange valves, also to actuate a throttle element, in particular a throttle valve in the intake pipe of the internal combustion for adjusting the amount of combustion air corresponding to the present operating state of the internal combustion engine. The actuation of the throttle valve is necessary in particular in operating ranges in which the desired intake pressure lies below atmospheric pressure. In this case, it is necessary to generate a negative pressure in the intake pipe, which can be effected by corresponding positioning of the throttle valve.

The throttle valve is assigned a function block TLVDK, which is Used to activate the throttle valve as a function of the valve stroke $vh_{desired}$. The valve stroke $vh_{desired}$ represents an average value of the valve-stroke values $vh_{desired,b1}$ and $vh_{desired,b2}$ of the left and right cylinder banks of the internal combustion engine. From the averaged valve stroke $vh_{desired}$, a value for the throttle-valve actuating angle sw is determined in the function block TLVDK, which value is fed to a throttle-valve-actuating element for setting the throttle valve.

In addition to the setting of the gas exchange valves and, if appropriate, of the throttle valve, the ignition instant, the beginning of fuel injection and the duration of fuel injection are determined as a function of the desired load $t_{l,tizw}$ in a further function block TLDYN. The desired air mass flow $t_{l,desired}$ is assigned ignition and injection parameters $t_{l,tizw}$ which are processed further in the function block TLDYN. The desired and actual values $vh_{desired}$ and $vh_{actual}$ of the valve stroke are additionally fed to the function block TLDYN, the said values being present at the output of the function block TLVEN assigned to the valves and, respectively, in the VLC controller of the gas exchange valves.

Effects occurring during non-steady-state operation are compensated in the function block TLDYN. These effects may arise by virtue of the fact that both the throttle valve and the controllers for the gas exchange valves have finite actuating times, which can lead to deviations between the desired values and the actual values in dynamic transition periods. These deviations may affect the amount of air in the cylinders, and, accordingly, the ignition and injection parameters must be adapted to the actual amount of air. This adaptation is carried out in the function block TLDYN.

After adaptation to non-steady-state operation in the function block TLDYN, the adapted ignition timing and injection timing parameters $t_{izw}$ are fed to the actuating elements for ignition and injection, and the ignition timing, the beginning of injection and the duration of injection are set as a function of the desired load taking account of non-steady-state influences.

The function blocks of the engine controller and regulator MS are illustrated in detail in FIGS. 2 to 7.

Figure 2:
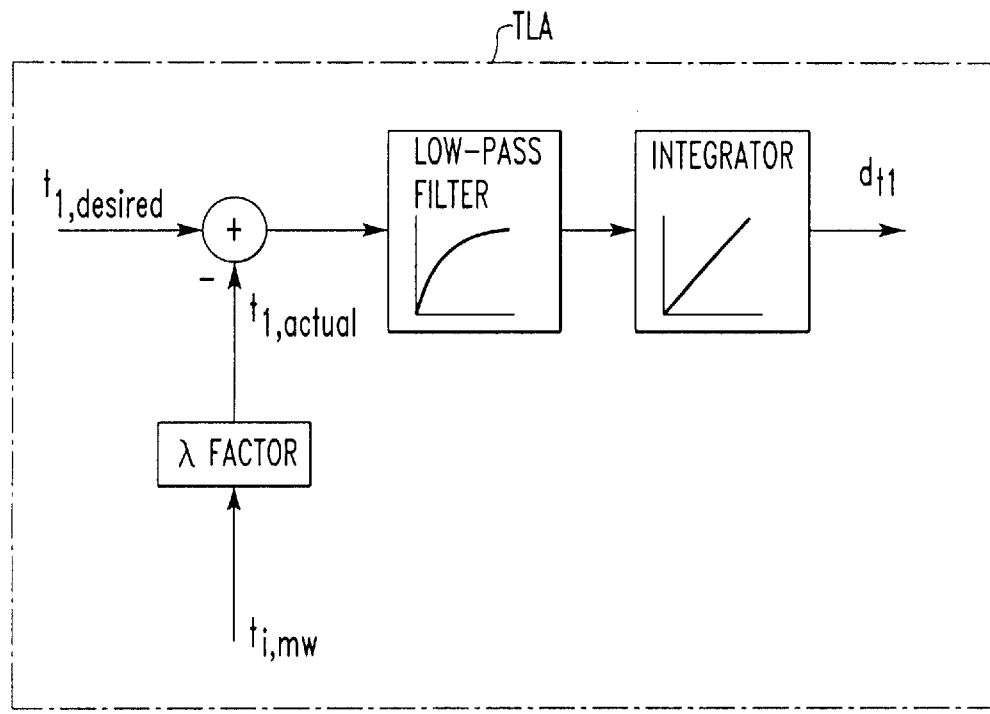
FIG. 2 shows a function block with an adaptation function for averaging the parameters relating to ignition and injection timing during steady-state operation.

FIG. 2 shows the function block TLA, which carries out averaging of the parameters relating to ignition and injecting during steady-state operation. The desired load $t_{l,desired}$ and also the average injection duration $t_{i,mw}$ are fed as input quantities to the function block TLA. The average injection duration $t_{i,mw}$ is firstly converted into the actual load $t_{l,actual}$ by export sure to a λ factor, the said actual load corresponding to the actual air mass situated in the cylinder. The difference between predetermined load $t_{l,desired}$ and actual load $t_{l,actual}$ is formed and this difference is filtered in a low-pass filter in which frequencies above a low-pass filter cut-off frequency are filtered out, in order to obtain a smoothed profile of values. The low-pass filtering is followed by integration in an integrator element. The correction load $dt_l$ is present at the output of the integrator element and is used to compensate for the difference between desired load $t_{l,desired}$ and actual load $t_{l,actual}$. The correction load $dt_l$ is fed to the function element TLDK, in which ambient pressure and ambient temperature are taken into account.

Figure 3:
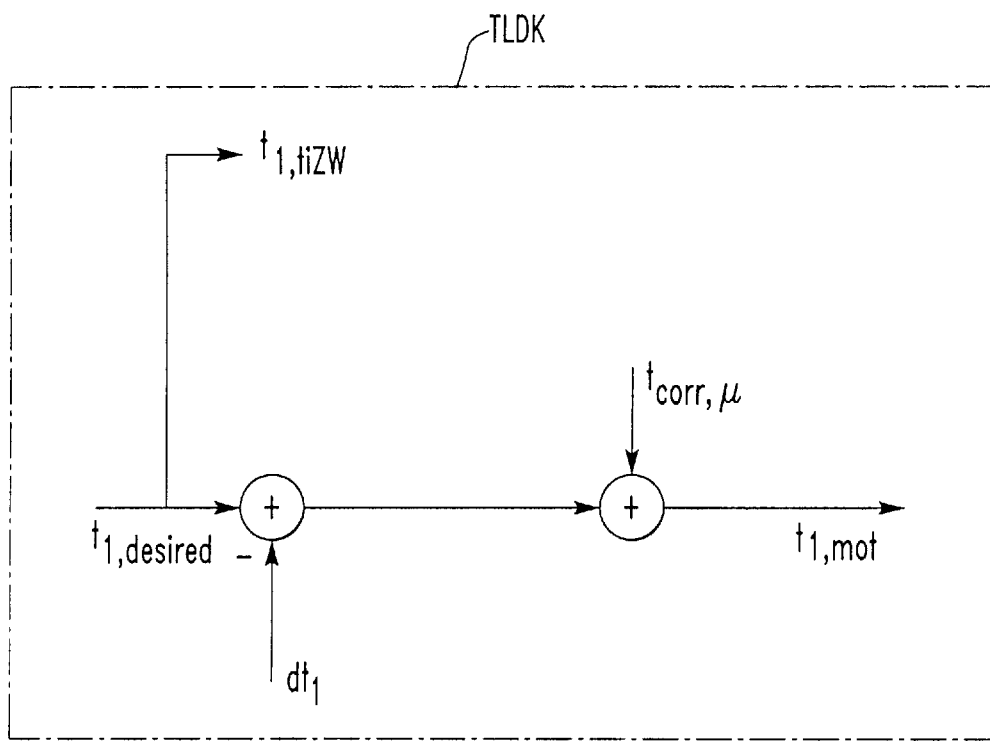
FIG. 3 shows a function block with a function for taking account of ambient pressure and ambient temperature.

The function block TLDK for taking account of ambient pressure and ambient temperature is illustrated in detail in FIG. 3. The correction load value $dt_l$ from the function block TLA is added to the predetermined load $t_{l,desired}$. The sum of desired load $t_{l,desired}$ and correction load $dt_l$ is multiplied by an ambient correction factor $f_{corr,U}$, which can be represented as a function of the present ambient temperature $T_a$, the present ambient pressure $p_a$ and also as a function of normalized quantities for pressure and temperature $p_{a,0}$ and $T_{a,0}$ in accordance with the relationship $$f_{corr,U}=p_{a,0}/p_a * T_a/T_{a,0}$$

By means of multiplication by the correction factor $f_{corr,U}$, the desired load is based on the normalized pressure and temperature values $p_{a,0}$ and $T_{a,0}$. What is obtained as a result of the multiplication is the desired air volume, $t_{l,mot}$, which is present at the output of the function block TLDK and is fed to the further function blocks.

Ignition and injection parameters $t_{l,tizw}$ are additionally determined from the desired air mass flow $t_{l,desired}$.

Figure 4:
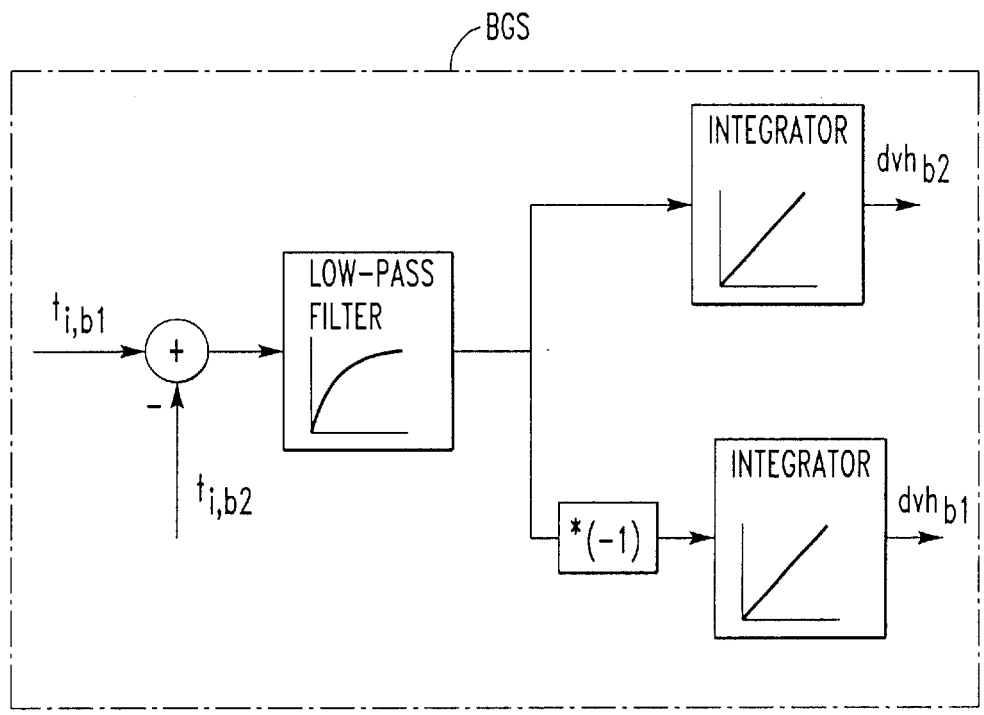
FIG. 4 shows a function block with a function for determining correction values in the event of differing condition values in different cylinder banks of an internal combustion engine.

FIG. 4 illustrates the function block for bank equalization or bank balancing BGS, in which the state variables of different cylinder banks of an internal combustion engine are matched to common values. In the bank equalizing arrangement BGS shown in the exemplary embodiment, the state variables of two cylinder banks of an internal combustion engine are matched to one another; however, embodiments are also conceivable in which more than two cylinder banks of an internal combustion engine are to be taken into account.

Bank-selective injection times $t_{i,b1}$ and $t_{i,b2}$ respectively assigned to a cylinder bank are fed as input quantities to the bank equalizing arrangement BGS. The difference between the bank-selective injection times $t_{i,b1}$ and $t_{i,b2}$ is formed and fed to a low-pass filter, in order to filter out frequencies below the low-pass filter cut-off frequency and to obtain a smoothed profile of values. The low-pass filtering is followed by integration in integrator elements, a positive value $dvh_{b2}$ for the correction valve stroke being fed to that cylinder bank whose bank-selective injection time $t_{i,b2}$ was subtracted at the input of the function block, whereas a negative value $dvh_{b1}$ for the correction valve stroke is fed to that cylinder bank whose bank-selective injection time $t_{i,b1}$ is positive at the input of the function block. This sign reversal results in matching to a common average value in that the values—deviating from an average value—for the bank-selective injection times $t_{i,b1}$ and $t_{i,b2}$, respectively, are compensated by an opposite correction element.

Figure 5:
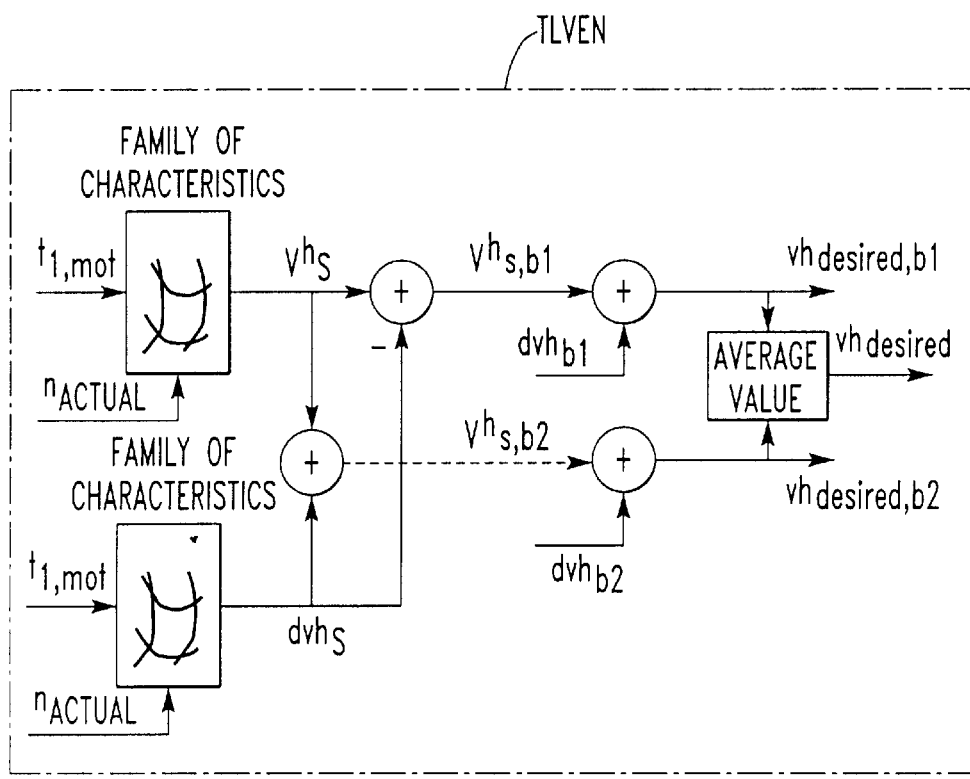
FIG. 5 shows a function block with a function for determining the desired valve stroke corresponding to the desired load.

FIG. 5 shows a detailed illustration of the function block TLVEN for determining the desired valve stroke $vh_{desired,b1}$ and $vh_{desired,b2}$ for each cylinder bank of the internal combustion engine. The desired air volume $t_{l,mot}$ and the engine speed $n_{actual}$ are fed as input quantities to the function block TLVEN. In families of characteristics of the function block TLVEN, an average valve-stroke control value $vh_s$ and an average valve-stroke correction value $dvh_s$ are determined from the desired air volume $t_{l,mot}$ as a function of speed. The correction value $dvh_s$ is firstly subtracted from the control value $vh_s$, thereby obtaining a provisional desired valve stroke $vh_{s,b1}$ for the first cylinder bank, and secondly the correction value $dvh_s$ is added to the control value $vh_s$, thereby obtaining a second, provisional desired valve stroke $vh_{s,b2}$ for the second cylinder bank. The correction valve stroke $dvh_{b1}$ and $dvh_{b2}$ assigned to the respective cylinder bank is added to the provisional desired valve strokes $vh_{s,b1}$ and $vh_{s,b2}$, respectively; the correction valve strokes $dvh_{b1}$ and $dvh_{b2}$ for the first and the second cylinder bank, respectively, were determined in the bank equalizing block BGS (FIG. 4) connected upstream of the function block TLVEN for valve stroke determination.

The final desired valve strokes $vh_{desired,b1}$, and $vh_{desired,b2}$ for the gas exchange valves of the first and the second cylinder bank, respectively, are determined by the addition of the provisional desired valve strokes $vh_{s,b1}$ and $vh_{s,b2}$ and the respective correction valve strokes $dvh_{b1}$ and $dvh_{b2}$. Moreover, an average value $vh_{desired}$ is expediently calculated from the two desired valve strokes $vh_{desired,b1}$ and $vh_{desired,b2}$.

Figure 6:
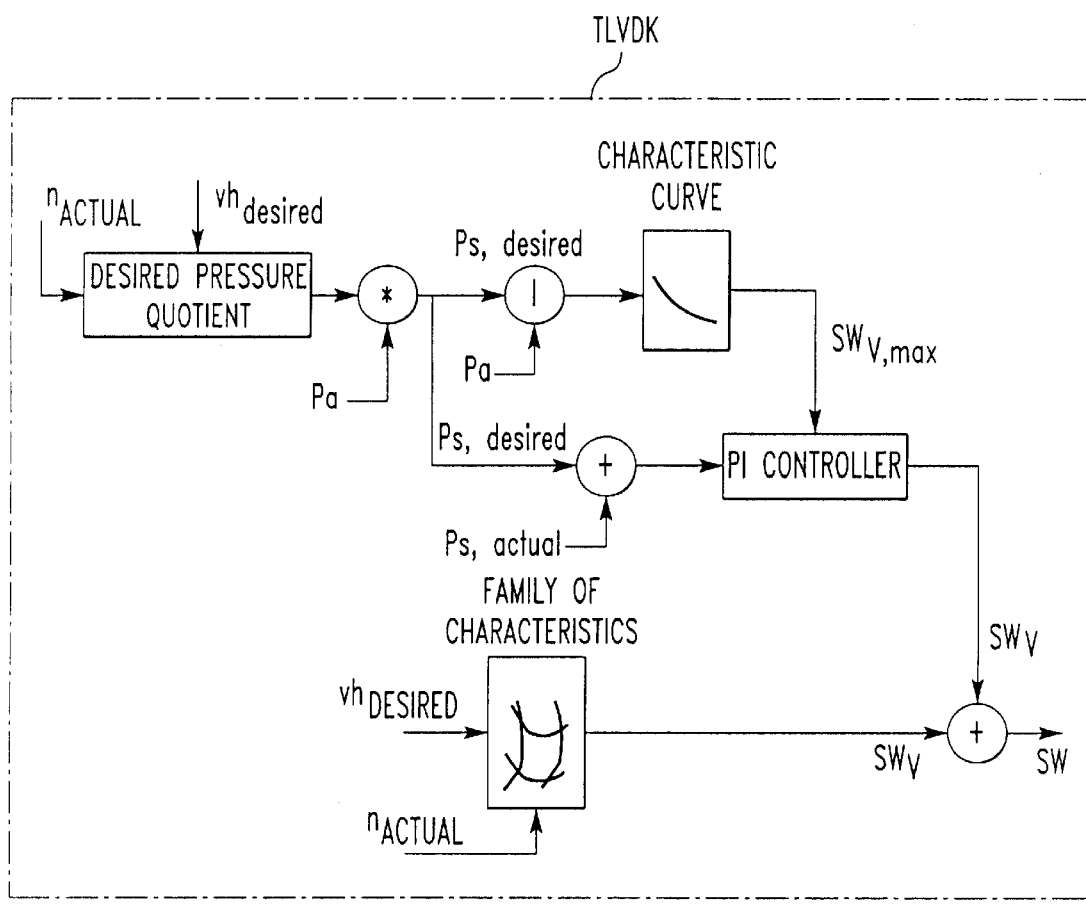
FIG. 6 shows a function block with a function for determining the desired position of the throttle element in the intake tract of the internal combustion engine.

FIG. 6 illustrates the method of operation of the function block TLVDK comprising the structuring of the throttle valve control. The average value $vh_{desired}$—determined in the function block TLVEN (FIG. 5)—for the valve stroke together with the engine speed $n_{actual}$ are fed as input values to the function block TLVDK. From them, a desired pressure quotient is formed, which is multiplied by the present ambient pressure $p_a$ in order to obtain a desired pressure $p_{s,desired}$. In a first branch of the function block TLVDK, the desired pressure $p_{s,desired}$ is divided by the value of the present ambient pressure $p_a$ and fed to a characteristic curve which provides for maximal regulator limiting $sw_{r,max}$ for the throttle-valve angle.

Moreover, in a further branch of the function block TLVDK, the desired pressure $p_{s,desired}$ is compared with the actual pressure $p_{s,actual}$ in the intake pipe, and the difference between desired pressure and actual pressure in the intake pipe is fed as input value to a PI regulator. The regulator output $sw_r$ of the PI regulator is limited to the regulator limiting $sw_{r,max}$.

In the further course of events, the regulator output $sw_r$ that has been determined is added to a pre-control value $sw_v$ of the throttle-valve angle, the pre-control value $sw_v$ being determined from a performance graph as a function of the desired valve stroke $vh_{desired}$ and the engine speed $n_{actual}$. The resulting throttle-valve angle $sw$ is to be fed to a throttle-valve actuating element.

Figure 7:
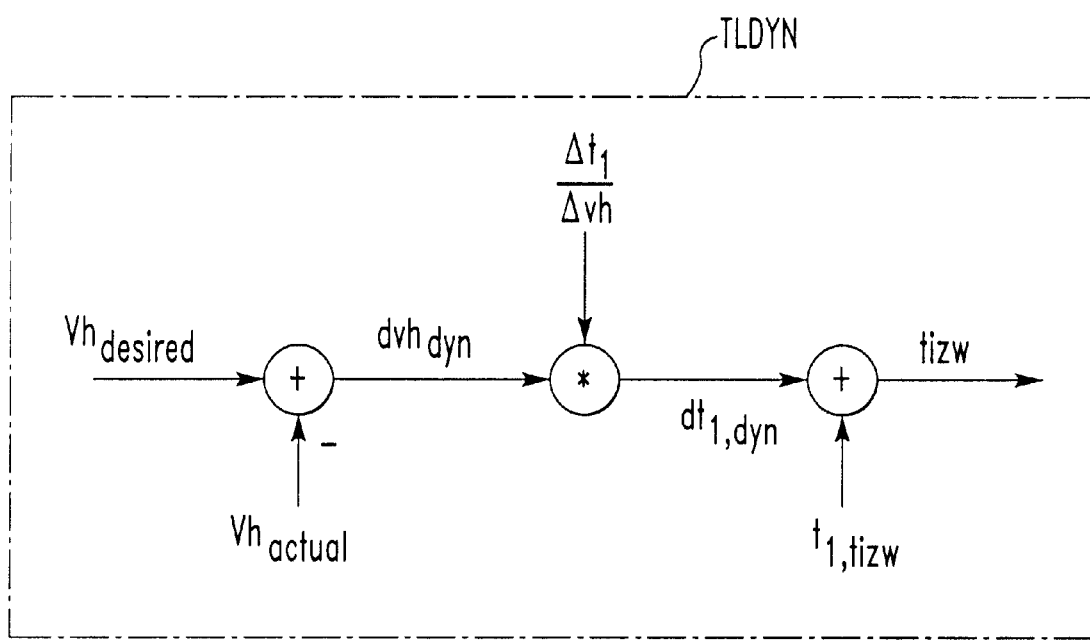
FIG. 7 shows a function block with a function for taking account of dynamic effects during ignition and injection during non-steady-state operation of the internal combustion engine.

FIG. 7 illustrates a function block TLDYN for taking account of dynamic effects during ignition and injection in a non-steady-state operation of the internal combustion engine. The values for the actual valve stroke $vh_{actual}$ and the desired valve stroke $vh_{desired}$ are fed as input values to the function block TLDYN, where a difference $dvh_{dyn}$ is formed, the actual valve stroke $vh_{actual}$ expediently being tapped off from the VLC controller of the gas exchange valves. The differential valve stroke $dvh_{dyn}$ is multiplied by a gradient calculated from the division of a load change $\Delta t_l$ by a valve-stroke change $\Delta vh$, the load change $\Delta t_l$ being determined from two temporally successive desired loads $t_{l,desired}$ and the valve-stroke change $\Delta vh$ denoting the change in successive desired valve strokes $vh_{desired}$ with respect to time. Multiplying the differential valve stroke $dvh_{dyn}$ by the gradient formed by the quotient of the load change and the valve-stroke change yields a dynamic load change $dt_{l,dyn}$, to which, subsequently, the ignition and injection parameters $t_{l,tizw}$ for the steady-state internal combustion engine state are added. The addition of the steady-state ignition and injection timing parameters $t_{l,tizw}$ to the value of the dynamic load change $dt_{l,dyn}$ produces dynamic ignition and injection timing parameters $t_{izw}$ which are fed to the units of the internal combustion engine which control ignition and injection timing.

Figure 8:
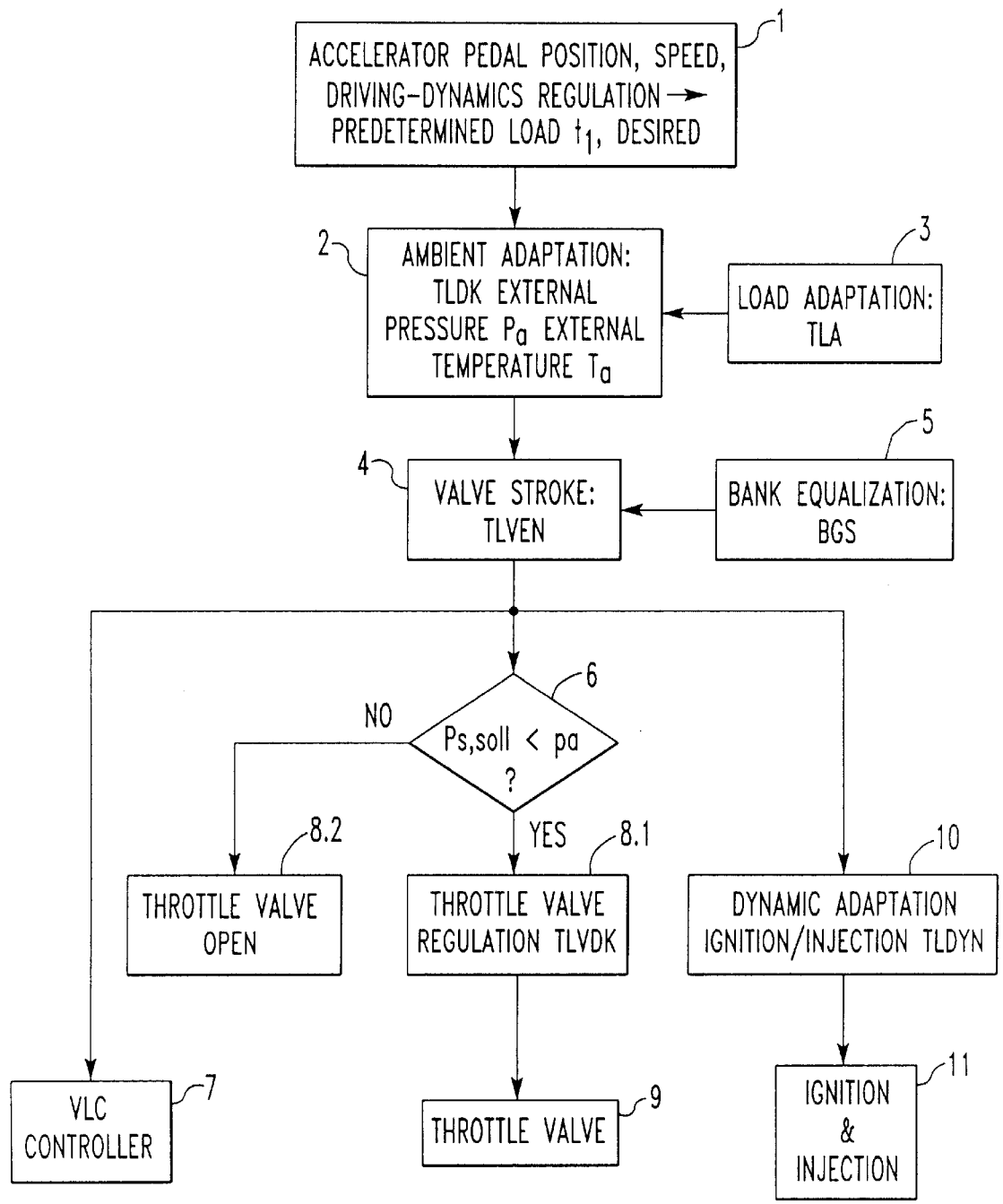
FIG. 8 shows a flow diagram for predictive load control in an internal combustion engine with a variable valve stroke.

FIG. 8 shows a flow diagram containing the individual steps which are to be carried out for predictive load control of an internal combustion engine provided with gas exchange valves with a variable valve stroke. The method steps illustrated in FIG. 8 are carried out in the engine controller and regulator MS from FIG. 1.

In accordance with a first method step 1, the momentary desired load $t_{l,desired}$ is determined from the accelerator pedal position, from the engine speed and also, if appropriate, further variables such as, for example, driving-dynamics control or control values of an electronic stability program. The desired load $t_{l,desired}$ is processed further in the subsequent method step 2 in a function block TLDK, in which ambient conditions are taken into account. The ambient pressure $p_a$ and the ambient temperature $T_a$ are taken into account, and a normalization to a standard pressure and a standard temperature is carried out. Moreover, results of upstream load adaptation in a method step 3 may be taken into account in method step 2, where the load adaptation is to be carried out in the function block TLA.

After the ambient conditions have been taken into account, the desired valve stroke which is to be performed by the gas exchange valves in accordance with the predetermined load is determined in a further method step 4. The valve stroke is determined in a function block TLVEN. Upstream of this function block there may be a method step 5, in which bank equalization is taken into account, wherein differing condition variables of different cylinder banks of the internal combustion engine are equalized. The determination of the correction values for carrying out the bank equalization takes place in the function block BGS.

After the determination of the desired valve stroke in method step 4 in the function block TLVEN, in the next method step 6 an interrogation is made as to whether the required desired pressure $p_{s,desired}$ is less than the ambient pressure $p_a$. In the no branch, the throttle valve is brought to the open position (method step 8.2), and in the yes branch, the throttle valve is controlled by means of the pressure regulation (method steps 8.1 and 9). The VLC controller is activated in each case (method step 7).

If the interrogation in method step 6 reveals that the desired pressure $p_{s,desired}$ lies below the ambient pressure $p_a$, the yes branch is continued in accordance with method steps 8.1 and 9, according to which the throttle-valve setting is controlled so as to generate an intake-pipe negative pressure. In method step 8.1, which represents the function block TLVDK, the throttle-valve position as described in FIG. 6 is determined, and in method step 9, the control value is fed to an actuating element of the throttle valve for setting the throttle valve.

It may be expedient, if appropriate, to carry out the setting of the throttle valve in addition to controlling the gas exchange valves. In this case, no alternative setting of the throttle valve position is performed, rather in each case the throttle valve position is controlled in addition to the control of the gas exchange valves, the throttle valve setting being defined by means of a performance graph. If the desired pressure lies in the vicinity of the ambient pressure or exceeds the ambient pressure, the throttle valve position is not altered, or is only minimally altered, in accordance with the value of the performance graph.

After the determination of the desired valve stroke in method step 4, the ignition and injection are carried out in parallel with the setting of the gas exchange valves (method step 7) and/or the throttle valve (method steps 8.1 or 8.2 and 9) in accordance with method steps 10 and 11, the desired load being used as a basis for the setting of the values for ignition and injection timing. In method step 10, firstly an adaptation to dynamic processes in the internal combustion engine is carried out, in order to ensure that effects occurring in non-steady-state operation, in particular inertia of mechanical actuators, are compensated for. In the subsequent method step 11, the values based on the predetermined load, if appropriate with adaptation to the dynamic processes in the internal combustion engine for the ignition and injection timing, are fed to the respective units of the internal combustion engine for setting the ignition timing, the beginning of fuel injection and the duration of fuel injection.

What is claimed is:

1. A method of operating an internal combustion engine which has at least two separately controlled cylinder banks, an intake pipe leading to said cylinder banks, an air supply device for supplying combustion air to said intake pipe and said cylinder banks, said method comprising the steps of determining, as a function of a predetermined load ($t_{l,desired}$) of the internal combustion engine, a desired pressure ($p_{s,desired}$) in said intake pipe of the internal combustion engine as provided by means of said air supply device, determining for each cylinder bank at least one engine-related characteristic value consisting of at least one of ignition timing, beginning of fuel injection, duration of fuel injection, and opening and closing curves of the gas exchange valves, which affects the behavior of the internal combustion engine, comparing the characteristic values as determined for each cylinder bank and, in the event of a difference between the characteristic values of the cylinder banks, manipulating at least one engine operating parameter used to form of said characteristic values for at least one cylinder bank in such a way that the average of said at least one engine operating characteristic value equals a desired average value.

2. A method according to claim 1, wherein the momentary injection times in each cylinder bank are determined as characteristic values.

3. A method according to claim 2, wherein for the setting of the engine-related characteristic values the opening and closing curves of the gas exchange valves are manipulated.

4. A method according to claim 3, wherein for the setting of the engine-related characteristic quantities the opening and closing times of the gas exchange valves are manipulated.

5. A method according to claim 4, wherein electromagnetically actuable gas exchange valves are used for the manipulation of the gas exchange.

6. A method according to claim 1, wherein a difference between the characteristic values of two cylinder banks is formed and integrated in an integrator element, and the integrated value is fed to the cylinder banks as correction value, a negative sign being applied to that correction value which is fed to the cylinder bank whose characteristic values were added for the purpose of establishing the difference formation.

7. A method according to claim 1, wherein at least one characteristic value to be investigated is subjected to low-pass filtering.

8. A method according to claim 1, wherein the setting of the engine-related characteristic values is so adjusted that each characteristic value corresponds to the desired average value.

9. A method according to claim 1, wherein the engine-related characteristic values are adjusted such that the characteristic values of all the cylinder banks correspond to the desired average value.

10. A method according to claim 1, wherein the ignition timing, the beginning of fuel injection and the duration of injection are determined in accordance with a desired relationship as a function of the predetermined load ($t_{l,desired}$) and are fed as actuating signal to actuating elements by means of which the ignition timing and the fuel injection, respectively, are controlled.

11. A method according to claim 10, wherein the relationship between ignition timing, and respectively fuel injection, and desired load is stored in a performance graph of an engine control unit.

12. A method according to claim 11, wherein the setting of the ignition timing and of the fuel injection, respectively, is based on Lambda control.

13. A method according to claim 11, wherein the setting of the ignition timing and of the injection, respectively, is based on engine knock control.

14. A method according to claim 11, wherein the external pressure and ambient temperature are taken into account in the determination of ignition timing, beginning of fuel injection and duration of fuel injection.

* * * * *